(12) United States Patent
Sun et al.

(10) Patent No.: US 10,355,483 B2
(45) Date of Patent: Jul. 16, 2019

(54) FULLY DISTRIBUTED FILTERING FOR LOAD-BASED DYNAMIC STATE ESTIMATION

(71) Applicant: Mitsubishi Electric Research Laboratories, Inc., Cambridge, MA (US)

(72) Inventors: Hongbo Sun, Lexington, MA (US); Ariana Minot, Somerville, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 474 days.

(21) Appl. No.: 15/175,522

(22) Filed: Jun. 7, 2016

(65) Prior Publication Data

US 2017/0353031 A1    Dec. 7, 2017

(51) Int. Cl.
    *H02J 3/06*      (2006.01)
    *H02J 3/18*      (2006.01)
    *G06Q 50/06*     (2012.01)
    *H02J 3/00*      (2006.01)

(52) U.S. Cl.
    CPC ............. *H02J 3/06* (2013.01); *G06Q 50/06* (2013.01); *H02J 3/18* (2013.01); *G05B 2219/2639* (2013.01); *H02J 2003/007* (2013.01); *Y02E 40/30* (2013.01); *Y02E 60/76* (2013.01); *Y04S 40/22* (2013.01)

(58) Field of Classification Search
    CPC .......... H02J 3/06; H02J 3/18; H02J 2003/007; G06C 50/06; G05B 2219/2639

USPC .......................................................... 703/18
See application file for complete search history.

(56) References Cited

FOREIGN PATENT DOCUMENTS

| CN | 101615794 A | 12/2009 |
| CN | 103326358 A | 6/2013 |
| CN | 103326358 | * 9/2013 |
| CN | 101615794 | * 12/2013 |
| WO | 2013187975 | * 12/2013 |
| WO | 2013187975 A1 | 12/2013 |

* cited by examiner

*Primary Examiner* — Brian S Cook
(74) *Attorney, Agent, or Firm* — Gennadiy Vinokur; James McAleenan; Hironori Tsukamoto

(57) ABSTRACT

Methods and Systems for dynamic state estimation (DSE) in an electric power system (EPS) having a multi-control area interconnected power network. Estimating current states of buses in a control area using historical data via a state transition model of buses of the control area. Receiving, a current state of 1-hop and n-hop neighboring buses located in neighboring control areas. A 1-hop neighboring bus connects to one boarder bus of the control area via a tie-branch and n-hop neighboring bus is connected to the 1-hop neighboring bus via at least one tie-branch, wherein n is greater than one. Determining measurements of states from buses in the control area. Finally, updating the current state of the buses using a measurement model on a basis of estimated current states of the control area, the received states from the neighboring control areas, and the measurements of states from buses in the control area.

19 Claims, 9 Drawing Sheets

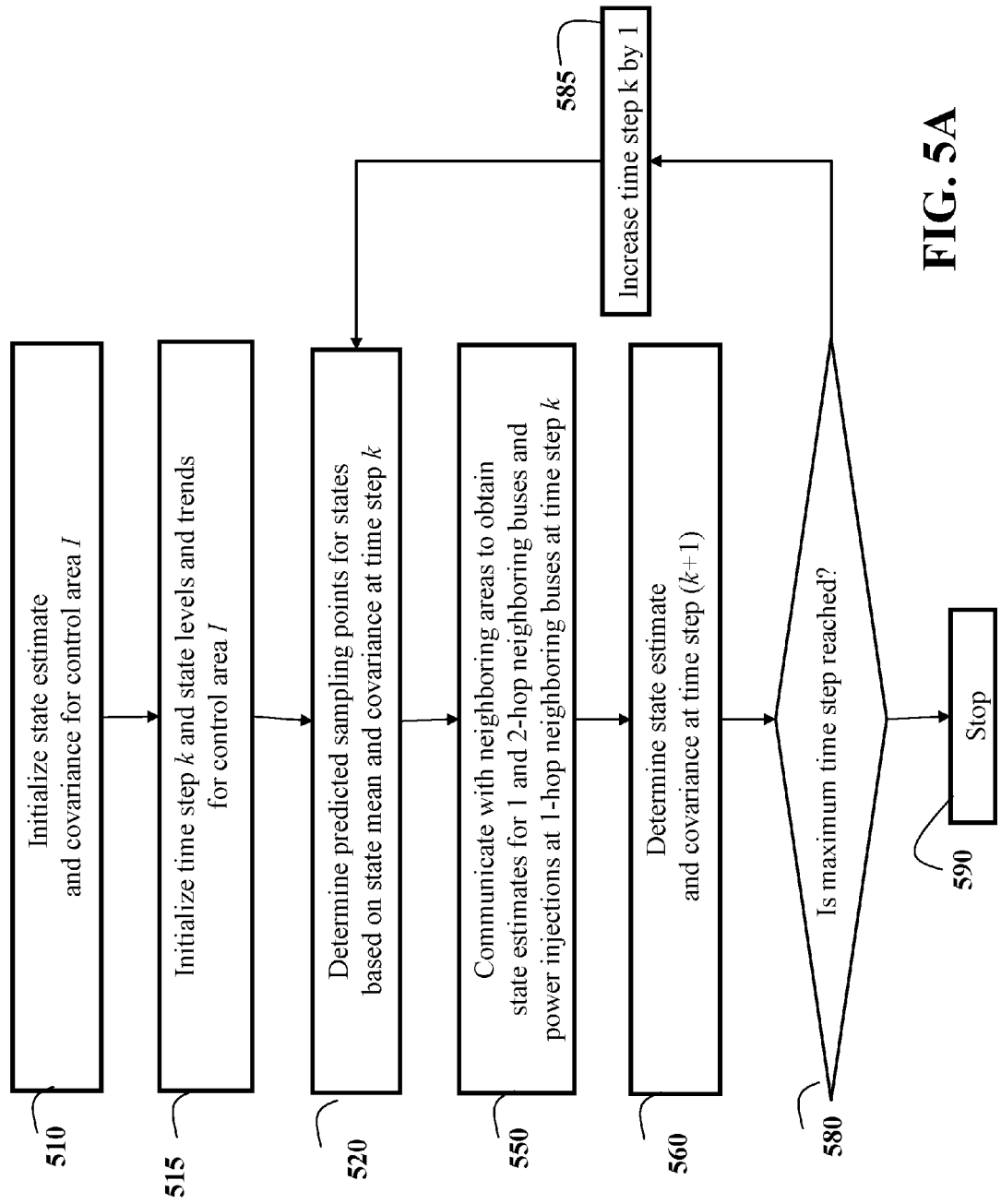

FULLY DISTRIBUTED FILTERING FOR LOAD-BASED DYNAMIC STATE ESTIMATION

FIELD

The disclosure relates generally to methods and systems of dynamic state estimation of electric power systems. In particular, methods and systems relating to dynamic state estimation in electric power systems having a multi-control area interconnected power network.

BACKGROUND

Accurate state estimation is an integral part of maintaining safe operating conditions of electric power systems and serves as input for control functionalities, such as economic dispatch and optimal power flow problems. State estimation can be divided into two categories, one is static state estimation and the other is dynamic state estimation.

In static state estimation, the system state is inferred using only measurements from the current snapshot in time. Dynamic state estimation uses information from prior measurements in addition to the current measurements to make an improved estimate. The dynamic state estimation is a large-scale nonlinear state estimation problem for a practical electric power system. The solution accuracy and efficiency of dynamic state estimation method plays a crucial role for the success of its real-time applications.

For example, the method described in CN 101615794A discloses a dynamic state estimation method for an electrical power system based on an unscented Kalman filter (UKF). However, this method is not fully distributed and thus requires communication with a central processor and a risk of communication bottleneck. Accordingly, there is still a need for a system and a method for dynamic state estimation of an electric power system.

SUMMARY

The present disclosure relates to methods and systems of dynamic state estimation of electric power systems. The disclosure includes methods and systems relating to dynamic state estimation in electric power systems having a multi-control area interconnected power network.

According to an embodiment of the disclosure, a method for dynamic state estimation (DSE) in an electric power system (EPS). The method including partitioning the EPS into multiple neighboring control areas, wherein the multiple neighboring control areas include a first control area. Further, estimating current states of buses in the first control area using the states of the buses via a state transition model of the buses of the first control area, wherein the states of the buses is from historical data of the EPS. Further, receiving, over a communication channel, a current state of at least some of 1-hop neighboring buses and at least some of n-hop neighboring buses located in the neighboring control areas. Wherein a 1-hop neighboring bus is a bus of a neighboring control area that connects to at least one boarder bus of the first control area via at least one tie-branch, and wherein a n-hop neighboring bus is connected to the 1-hop neighboring bus within the neighboring control area via at least one tie-branch, wherein n is greater than one. Determining measurements of states from at least some buses in the first control area. Finally, updating the current state of the buses in the first control area using a measurement model on a basis of the estimated current states of the buses in the first control area, the received states from the neighboring control areas, and the measurements of states from at least some buses in the first control area. Wherein at least some steps of the method are performed by one or more processor.

According to another embodiment of the disclosure, a control system of an electric power system (EPS), wherein the EPS includes multiple neighboring control areas (MNCA). The system including a memory to store historical states of the MNCA, current states of the MNCA and a state transition model that estimates current states of the MNCA using historical states of the MNCA. Further, a set of sensors arranged at measuring buses in the MNCA to measure one or combination of power flows, power injections, voltage magnitudes and phase angles on the measuring buses in the MNCA. A processor to determine an updated current state of a first control area of the MNCA via a measurement model and to update. Wherein the method includes using estimated current states of at least some buses in the first control area, states from neighboring control areas adjacent to the first control area including a current state of at least some of 1-hop neighboring buses and at least some of n-hop neighboring buses located in the neighboring control areas. Wherein a 1-hop neighboring bus is a bus of a neighboring control area that connects to at least one boarder bus of the first control area via at least one tie-branch, and wherein a n-hop neighboring bus is connected to the 1-hop neighboring bus within the neighboring control area via at least one tie-branch, such that n is greater than one, and the measurements of states from at least some buses in the first control area. Further, wherein the updated current state of the first control area of the MNCA is based on corresponding differences between one or combination of corresponding differences between updated power flows, updated power injections, updated voltage magnitudes and updated phase angles corresponding to the current state with the measurements of power flows, power injections, voltage magnitudes and phase angles for at least some buses.

Further features and advantages of the present disclosure will become more readily apparent from the following detailed description when taken in conjunction with the accompanying Drawing.

DESCRIPTION OF THE DRAWINGS

The present disclosure is further described in the detailed description which follows, in reference to the noted plurality of drawings by way of non-limiting examples of exemplary embodiments of the present disclosure, in which like reference numerals represent similar parts throughout the several views of the drawings. The drawings shown are not necessarily to scale, with emphasis instead generally being placed upon illustrating the principles of the presently disclosed embodiments.

FIG. 5A is a schematic flow chart for the distributed dynamic state estimation method based on unscented Kalman filter techniques, according to some embodiments of the present disclosure;

Figure 1:
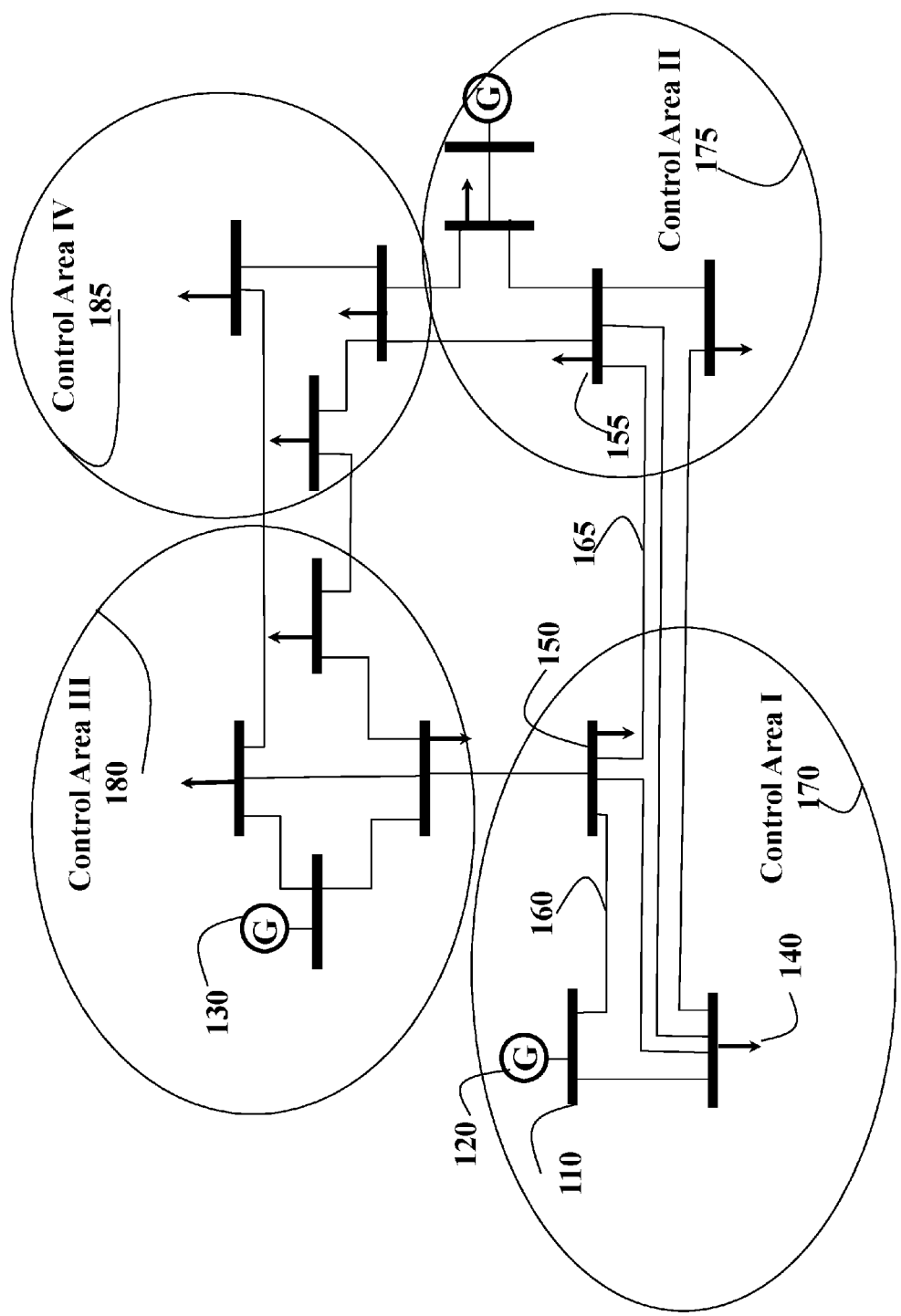
FIG. 1 is a schematic of an electric power system (EPS) having a multi-control area interconnected power network or multiple neighboring control areas, according to some embodiments of the present disclosure.

While the above-identified drawings set forth presently disclosed embodiments, other embodiments are also contemplated, as noted in the discussion. This disclosure presents illustrative embodiments by way of representation and not limitation. Numerous other modifications and embodiments can be devised by those skilled in the art which fall within the scope and spirit of the principles of the presently disclosed embodiments.

DETAILED DESCRIPTION

The following description provides exemplary embodiments only, and is not intended to limit the scope, applicability, or configuration of the disclosure. Rather, the following description of the exemplary embodiments will provide those skilled in the art with an enabling description for implementing one or more exemplary embodiments. Contemplated are various changes that may be made in the function and arrangement of elements without departing from the spirit and scope of the subject matter disclosed as set forth in the appended claims.

Specific details are given in the following description to provide a thorough understanding of the embodiments. However, understood by one of ordinary skill in the art can be that the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicated like elements.

Also, individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but may have additional steps not discussed or included in a figure. Furthermore, not all operations in any particularly described process may occur in all embodiments. A process may correspond to a method, a function, a procedure, a subroutine, a subprogram, etc. When a process corresponds to a function, the function's termination can correspond to a return of the function to the calling function or the main function.

Furthermore, embodiments of the subject matter disclosed may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

The present disclosure is directed to dynamic state estimation (DSE) in electric power systems (EPS) having a multi-control area interconnected power network or multiple neighboring control areas (MNCA). According to aspects of the disclosure, a current state for each control area of the MNCA of the EPS can be estimated, while still taking into account the effects from the rest of the MNCA. The effects may include states for 1-hop and 2-hop neighboring buses and power injections for 1-hop neighboring buses.

In particular, the effects may include, among other things, measurements of power flows on tie-branches (i.e., a transmission line, or transformer that connects buses across two different control areas) and measurements of power injections at border buses (i.e., a bordering bus of a control area with a bordering bus of an neighbour control area or 1-hop neighboring bus) introduce couplings between different control areas. In another words, by non-limiting example, the set of measurements relevant to a control area may include voltage phase measurements at buses in the control area, power flow measurements on internal branches within the control area and tie-branches, and power injection measurements at buses within the control area and neighboring buses connected via a tie-branch of the control area.

Wherein according to aspects of the disclosure, a fully distributed unscented Kalman filter (UKF) can be utilized for estimating the state of the control area with limited communication to the EPS and computational requirements. For example, the physics of electric power systems or a control area, namely the localized dependence of the measurement equations on voltage states, is utilized to achieve an approximate decoupling of the UKF that allows for distributed processing of the measurements and estimates of the control area. At least one beneficial feature of the present disclosure, among many other beneficial features, is that each control area only needs to hold an estimate of the local (control area) and neighboring states (neighboring control areas), rather than the global system, thus reducing memory requirements, among other things. Further, the present disclosure submits that the communication can be done in one-shot at each time step between neighboring control areas, making aspects of the present disclosure highly scalable, and each control area can locally run the UKF only once per time step.

Specifically, the present disclosure includes an approximation to the UKF method that allows for quicker computation time and increased robustness with respect to communication failure. In particular, aspects of the present disclosure include only communication of local information (control area), with neighboring control areas, wherein the computation time scales very favorably with the multi-control area interconnected power network size as may depend on the number of border buses within a control area and not on the total size of the power network.

Whereas, for large enough electric power systems, such large electric power systems can be computationally prohibitive to solve the full centralized state estimation problem within real-time constraints. As noted above, the present disclosure includes decentralized approaches that alleviate the computational burden by decomposing the problem into smaller problems per area, as well as improving the electric power system's robustness in the event of communication failures, among other things.

FIG. 1 is a schematic of an electric power system (EPS) which includes a set of buses, 110 that connect to each other through branches, according to embodiments of the present disclosure. A branch 160 is connected between a pair of buses, 110 and 150, and can be a transmission line, a transformer or a phase shifter. A generator, 120 or a load, 140 can connect to the bus, 110 to inject or extract powers from the power system.

The system can be partitioned into several control areas. For example, in FIG. 1, the system is divided into 4 different control areas, including 170 (control area I), 175 (control area II), 180 (control area III) and 185 (control area IV). There is no overlap between buses between two adjacent control areas, but there may exist common branches between adjacent areas that are called tie branches. In FIG. 1, branch 165 is a tie branch that is connected with two control areas, 170 and 175.

FIG. 1 shows a multi-area interconnected power network, according to embodiments of the present disclosure, denoted by an undirected graph (V,E) with a set $$V^{def} = \{1, 2, \ldots, n\}$$

of buses and a set $E \subseteq V \times V$ of branches connecting the buses. Further, the step is to estimate the voltage phase angle and magnitude at every bus, $[x^k]^T = [\theta_1^k \ldots \theta_n^k \ V_1^k \ldots V_n^k] \in R^{2n}$ at each time step k, where n is the total number of buses.

The dynamics of the system are mainly driven by changes in the load. The changes of states can be reflected in the changes on the measurements. The following measurements are considered: the positive-directional real and reactive power flows on the branch between buses i and j, $P_{ij}$ and $Q_{ij}$; the negative-directional real and reactive power flows on the branch between buses i and j, $P_{ji}$ and $Q_{ji}$; the real and reactive power injections at bus i, $P_i$ and $Q_i$; and the voltage phase angle and magnitude at bus i, $\theta_i$ and $V_i$.

Some of measurements such as power flow, power injection and voltage magnitude measurements can be obtained using remote measurement units of a Supervisory Control And Data Acquisition (SCADA) system, and others such as bus voltage phase angle and magnitude can be obtained using phasor measurement units (PMUs). The AC power flow model nonlinearly relates the measurements, $y^k$ to the underlying states, $x^k$ according to:

$$y^k = h(x^k) + e^k, \quad (1)$$

where $e^k$ is a zero-mean Gaussian noise vector with a diagonal covariance matrix R, $y^k \in R^m$, and m is the total number of measurements. At least one goal of dynamic state estimation is to infer $x^k$ using past measurements up to and including time step k.

For an electric power system, the measurement models are described as a set of nonlinear equations of state variables. Taken the bus power injections as example, power injections can be related to bus voltages according to:

$$P_i = \text{Re}\left\{V_i e^{j\theta_i} \left[\sum_{j \in BUS} (Y_{i-j}^{SYS} V_j e^{j\theta_j})^*\right]\right\}, \text{ and} \quad (2)$$

$$Q_i = \text{Im}\left\{V_i e^{j\theta_i} \left[\sum_{j \in BUS} (Y_{i-j}^{SYS} V_j e^{j\theta_j})^*\right]\right\},$$

where, BUS is the set of buses in the system, $V_j$ and $\theta_j$ are the voltage magnitude and phase angle at bus j; $Y_{i-j}^{SYS}$ is the element of system admittance matrix at the row corresponding to bus i, and the column corresponding to bus j. The system admittance matrix $Y^{SYS}$ can be determined according to the branch connections in the system, and corresponding branch admittance matrices for each branch.

Similarly, the power flows at a two-terminal branch can be related to the voltage magnitudes and phase angles at two terminal buses as:

$$P_{ij} = \text{Re}[V_i e^{j\theta_i}(Y_{i-i}^{ij} V_i e^{j\theta_i} + Y_{i-j}^{ij} V_j e^{j\theta_j})^*], \text{ and} \quad (3)$$

$$Q_{ij} = \text{Im}[V_i e^{j\theta_i}(Y_{i-i}^{ij} V_i e^{j\theta_i} + Y_{i-j}^{ij} V_j e^{j\theta_j})^*],$$

$$P_{ji} = \text{Re}[V_j e^{j\theta_j}(Y_{j-i}^{ij} V_i e^{j\theta_i} + Y_{j-j}^{ij} V_j e^{j\theta_j})^*], \text{ and} \quad (4)$$

$$Q_{ji} = \text{Im}[V_j e^{j\theta_j}(Y_{j-i}^{ij} V_i e^{j\theta_i} + Y_{j-j}^{ij} V_j e^{j\theta_j})^*],$$

where, $P_{ij}$ and $Q_{ij}$, $P_{ji}$ and $Q_{ji}$ are the active and reactive powers flowing from bus i towards bus j, and from bus j towards bus i on the branch respectively. $Y_{i-i}^{ij}$, $Y_{i-j}^{ij}$, $Y_{j-i}^{ij}$ and $Y_{j-j}^{ij}$ are the elements of branch admittance matrix for the branch, $Y^{ij}$ at the row and column given by the subscript letters, in which the first ones give the corresponding bus of the row, and last ones give the corresponding bus of the column. The branch admittance matrix $Y^{ij}$ is used to define the relationship between the injected currents and voltages at terminal buses on the branch. It is a 2-by-2 square matrix. The formulation of branch admittance matrix can be different for different types of branches. For a transmission line, its branch admittance matrix is defined by its series impedances and its shunt admittances. For a transformer or a phase shifter, its admittance matrix is defined by its winding connections, tap positions, and impedances.

Figure 2A:
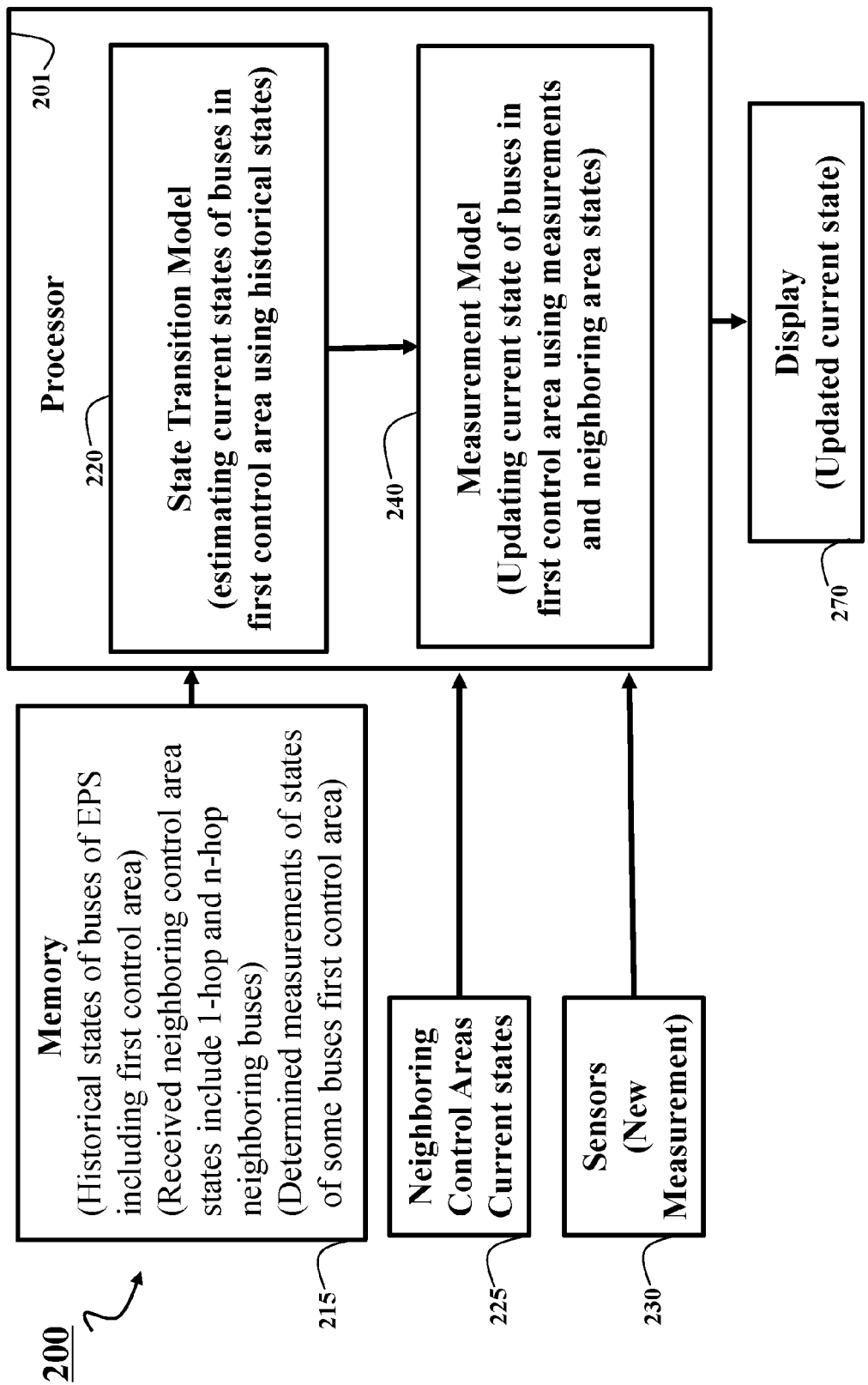
FIG. 2A is a schematic block diagram of an example of a control system that may be used with one or more embodiments described herein, according to some embodiments of the present disclosure.

FIG. 2A is a schematic block diagram of an example of a control system 200 that may be used with one or more embodiments described herein. The control system 200 may comprise of at least one processor 201, and a memory 215 connected to the processor 201, as well as a set of sensors 230. Further, the control system 200 includes communication from neighboring control areas 225 regarding neighboring current states. Contemplated may include one or more network interfaces e.g., wired, wireless, PLC, etc.) used with the system. Also contemplated may bet at least one power supply (i.e. battery, plug-in, etc.) may be used with the control system.

Still referring to FIG. 2A, the memory 215 can be implemented within the processor 201 and/or external to the processor 201. In some embodiments, the memory 215 stores historical states of EPS including a first control area, received neighboring control area states include 1-hop and n-hop neighboring buses and determined measurements of states of some buses of the first control area.

Similarly, the memory 215 can store the state transition model 220, measurement model 240 and/or instructions to the processor 201 of how to use the state transition model 220 and measurement model 240. For example, in various embodiments, the processor 201 determines estimations of the updated power flows, updated power injections, updated voltage magnitudes and updated phase angles corresponding to the updated current state using the measurement model that relates the measurements to state variables.

Still referring to FIG. 2A, in some embodiments, the processor 201 can include functionality blocks including a state transition model block 220, and a measurement model block 240. The data receiving, estimation execution, and results transmitting can be implemented in the processor 201.

Further, the processor 201 may comprise hardware elements or hardware logic adapted to execute software programs and manipulate data structures. The memory 215 may include an operating system, portions of which can typically resident in memory 215 and executed by the processor 201, functionally organizes the control system by, inter alia, invoking operations in support of software processes and/or services executing on the device.

As may be apparent to those skilled in the art that other processor and memory types, including various computer-readable media, may be used to store and execute program instructions pertaining to the techniques described herein. Also, while the description illustrates various processes, contemplated may be that various processes can be embodied as modules configured to operate in accordance with the techniques herein (e.g., according to the functionality of a similar process). Further, while the processes have been shown separately, those skilled in the art will appreciate that processes may be routines or modules within other processes.

Still referring to FIG. 2A, the set of sensors 230 can include remote measurement units which provide measurements for power flows for a branch, power injections for a bus, and voltage magnitude for a bus. The sensors 230 can also include phase measurement units which provide the magnitude and angle of voltages for a bus.

The system 200 can also include a screen or display 270. In some embodiments, the result of the state estimation can be rendered on the display 270 or submitted to different applications that can be internal or external to the system. For example, the results can be sent to a real-time monitoring and security analysis application which can be added to the processor 201.

Figure 2B:
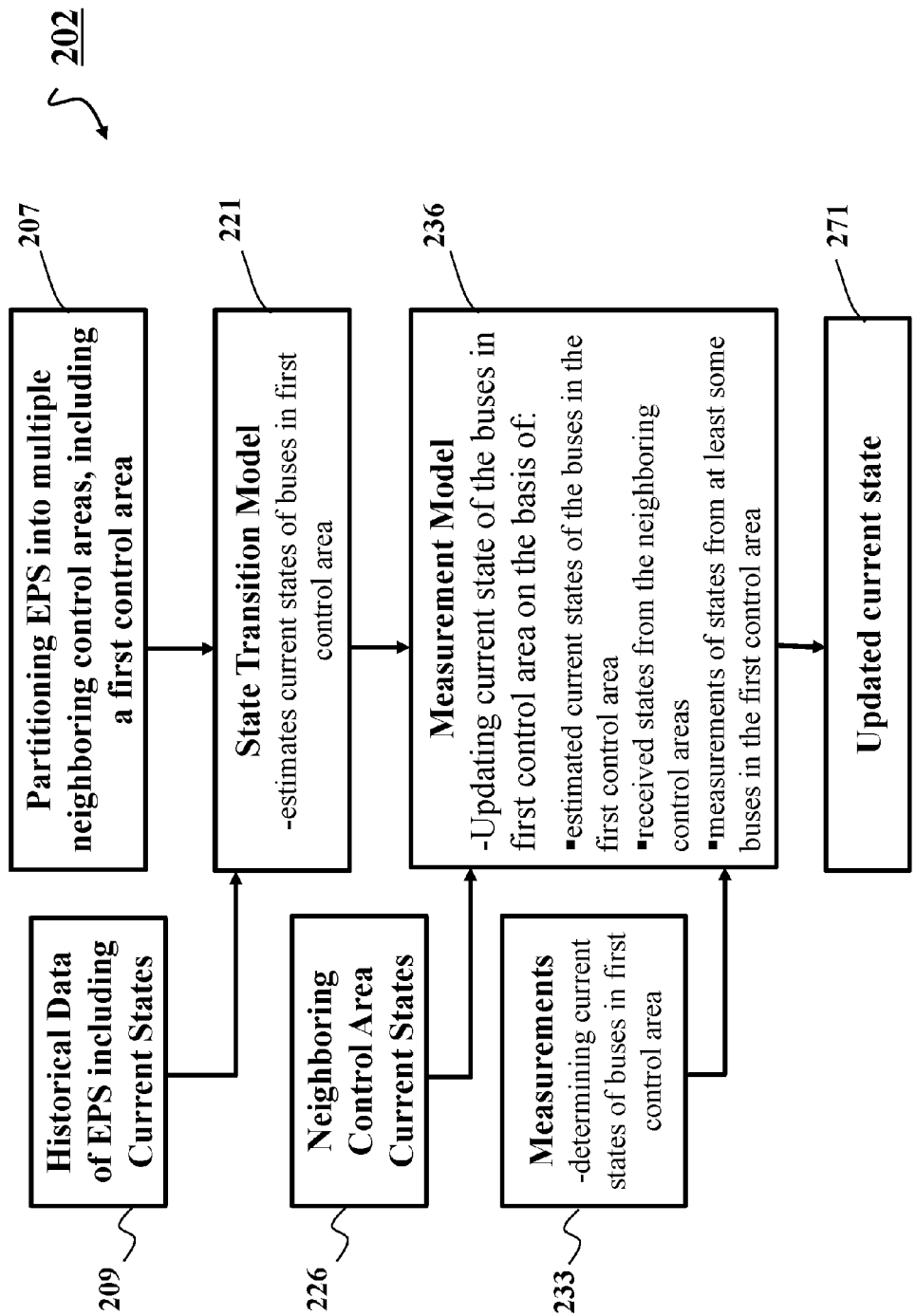
FIG. 2B is a block diagram of a method for dynamic state estimation (DSE) in an electric power system (EPS), according to one embodiment of the invention.

FIG. 2B is a block diagram of a method 202 for dynamic state estimation (DSE) in an electric power system (EPS), according to one embodiment of the present disclosure. The method including partitioning the EPS into multiple neighboring control areas 207, wherein the multiple neighboring control areas include a first control area. Further, estimating current states of buses in the first control area using the states of the buses via a state transition model 221 of the buses of the first control area, wherein the states of the buses is from historical data of the EPS 209. Further, receiving, over a communication channel, a current state of at least some of 1-hop neighboring buses and at least some of n-hop neighboring buses located in the neighboring control areas 226. Wherein a 1-hop neighboring bus is a bus of a neighboring control area that connects to at least one boarder bus of the first control area via at least one tie-branch, and wherein a n-hop neighboring bus is connected to the 1-hop neighboring bus within the neighboring control area via at least one tie-branch, wherein n is greater than one. Determining measurements of states from at least some buses in the first control area 233. Finally, updating the current state of the buses in the first control area using a measurement model 236 on a basis of the estimated current states of the buses in the first control area, the received states from the neighboring control areas, and the measurements of states from at least some buses in the first control area, so as to update the current state 271. Wherein at least some steps of the method are performed by one or more processor and the updated current state may be displayed on a display, i.e. monitor or some other related electronic display device.

Figure 2C:
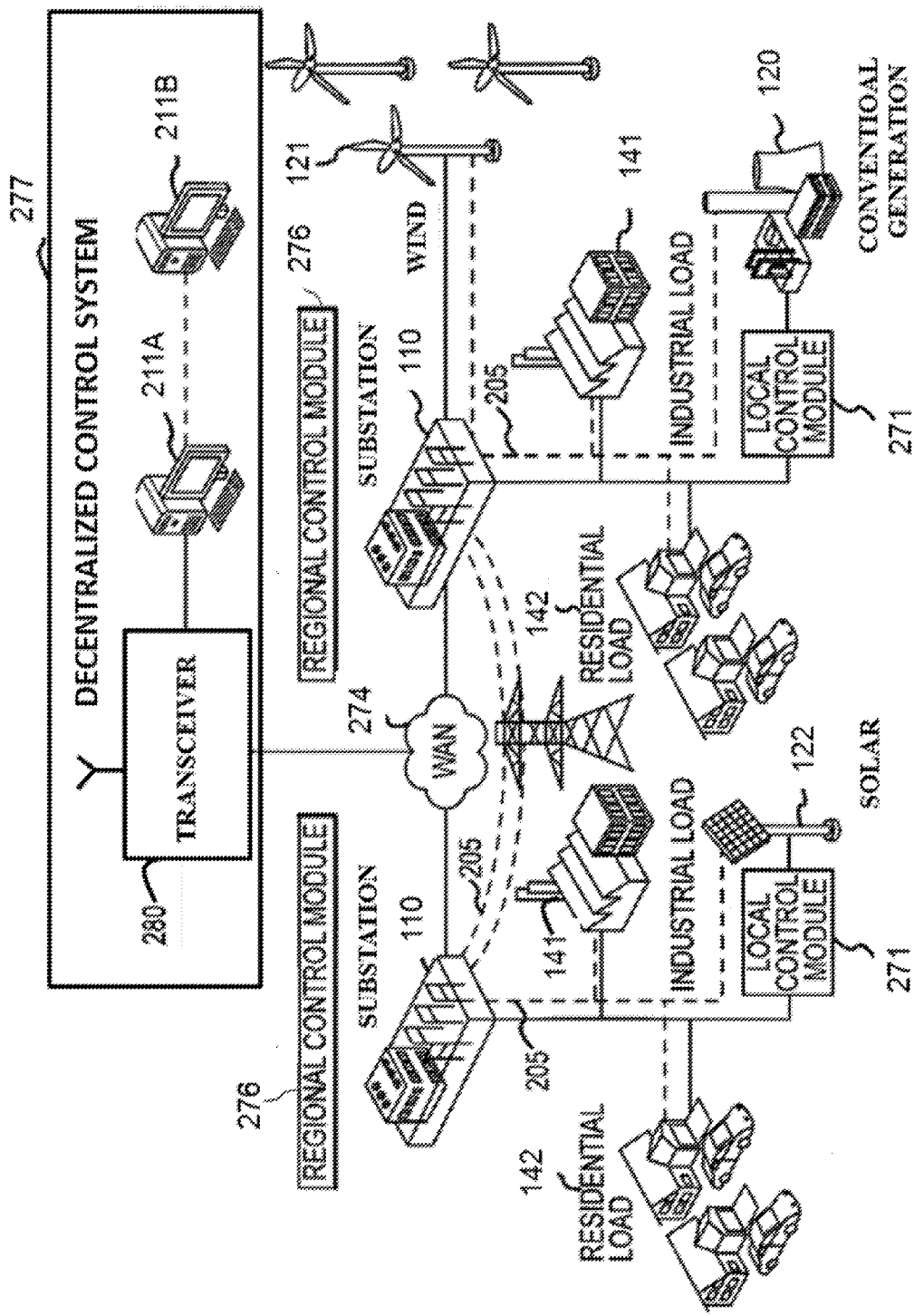
FIG. 2C is a schematic of an exemplar PDS controlled according to one embodiment of the present disclosure.

FIG. 2C shows a schematic of an exemplar EPS controlled according to one embodiment of the present disclosure. The conventional power generation facilities 120 are coupled to substations 110 as are renewable source of the energy such as wind turbine farms 121 and solar arrays 122. While FIG. 2C shows three forms of power generation, one skilled in the art will recognize that the present disclosure is applicable to any form of power generation or energy source. Indeed, some embodiments of the disclosure are equally capable of managing power added to the electric power grid from batteries as may be found in electric vehicles as long as the power is compatible with the grid format.

Associated with substations 110 is a regional control module 276. The regional control module manages power production, distribution, and consumption within its region. Also associated with each region are industrial/commercial loads 141 representative of industrial plant or large commercial enterprises and/or residential loads 142. According to some embodiments of the disclosure, each regional control module 276 using one or more applications is operable to manage the power production and distribution within its region.

For example, in some embodiments of the disclosure, each regional control module 276 is an independent regional energy operator distributing energy between energy generators and loads located within a corresponding region. In addition to control the electricity within the region, the regional energy operator can supply the excess of the electricity into the grid, or consume needed electricity from the grid. For example, depending on the time of the day, weather conditions, and other circumstances influencing energy production and consumption, the regional energy operator is the energy provider when the energy generators of the region produce more energy than demanded by the loads in the region. Alternatively, the regional energy operator is the energy consumer when the energy generators of the region produce less energy than demanded by the loads in the region. Different energy operators are interconnected with transmission lines 205 (shown in dashed lines).

In some implementations, power producing entity 210, such as the power generation plants 120 and the renewable or alternative energy sources 121,122, interfaces with the regional grid via a local control module 271. The local control module 271 can standardize control command responses with each of the plurality of power providers. By offering to the regional control module 276 a standardized response from each of the plurality of power producing entities, the regional control module can actively manage the power grid in a scalable manner. The regional control module 276 is further aware of the electricity producing capacity within the region and the limitations to the power grid. The regional control module 276 understands topology with respect to the power providers and power consumers and its own ability to distribute the power.

Each regional control module 276 is communicatively coupled to a control system 277 via, e.g., a wide area network 274. The wide area network can be the Internet or other means to communicate data among remote locations. Additionally, or alternatively, the data can be exchanged between the control system 277 and the regional control modules 276 via a local area network or Intranet. To that end, the control system 277 includes a transceiver 280 for exchanging data between the control system and regional control modules 276 via the network 274. Also, control system 277 includes one or several processors 211A and 211B to balance amounts of electricity passing through an electrical grid.

The control system 277 is operable to manage the interaction of several regional control modules 276 and the power providers under their control. As previously described, each regional control module 276 using applicable applications can dynamically manage the power consumers and power providers within its control. As demand (active power or reactive power) within a certain region managed by a regional control module 276 increases or decreases, the regional control module 276 needs to act to compensate for power production within a particular region. To that end, the regional control module 276 makes a decision about supplying or requesting the electricity from the grid. The control system 277 receives, transmits or retransmits such request to balance amount of electricity going in or off the grid.

Different embodiments of the disclosure control one or combination of the voltages on the buses of the EPS and/or a power generation and a load demand in the EPS. For example, one embodiment determines voltages on the buses from the updated states of the EPS and control voltage regulation devices of the EPS to drive the voltages on the buses toward a predetermine level. For example, the control system 277 can issue a command to the regional control module 276 to control their voltage regulation devices.

Additionally, or alternatively, some embodiments control one or combination of a power generation and a load demand in the EPS. For example, the control system 277 can issue a command to the regional control module 276 to increase an active or a reactive power injection into a bus when voltage on the bus is above a first threshold and to decrease the active or the reactive power injection into the bus when voltage on the bus is below a second threshold.

Measurement Configuration of Control Areas of the EPS

Figure 3:
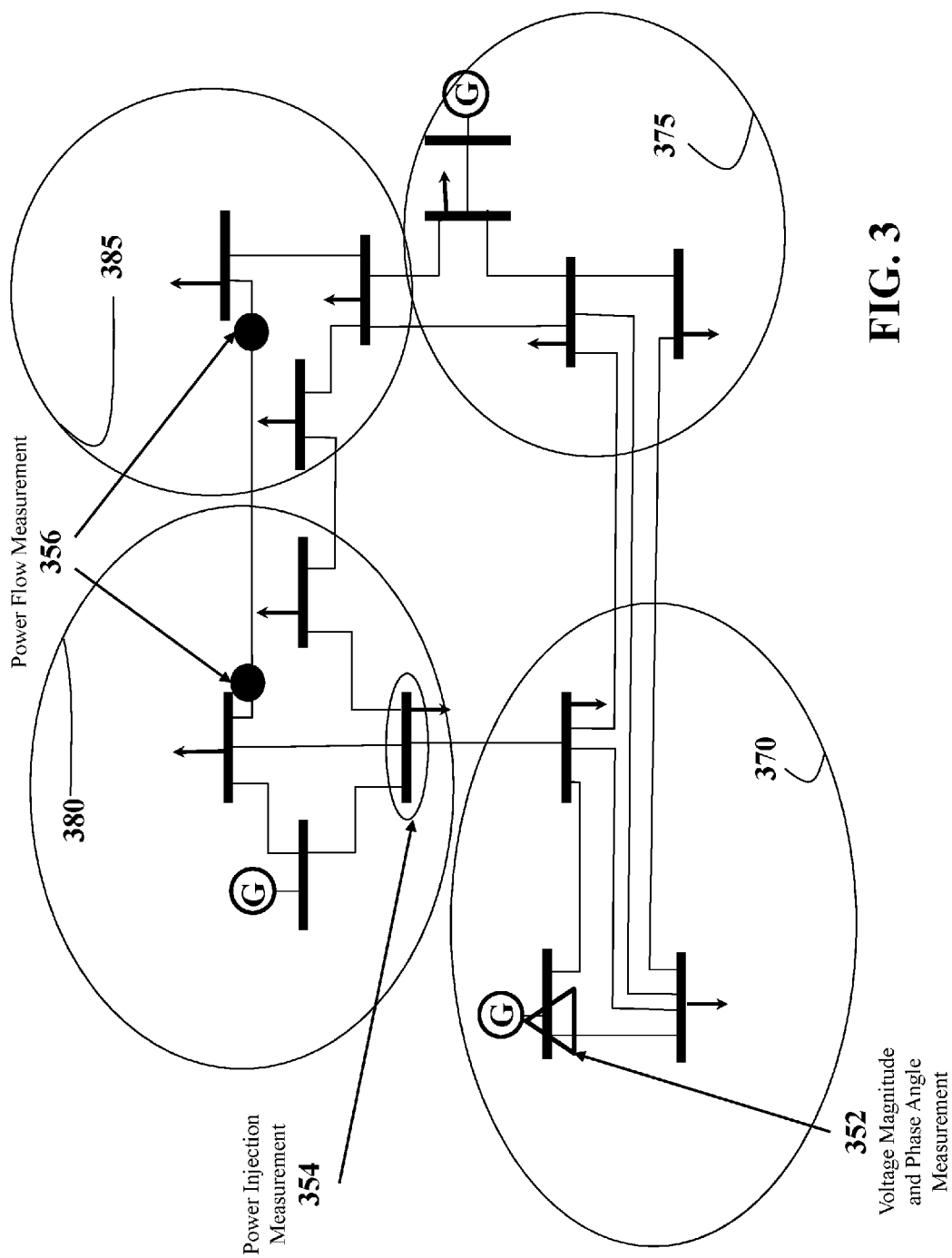
FIG. 3 is a schematic for a measurement configuration of the EPS, according to some embodiments of the present disclosure.

FIG. 3 is a schematic for measurement configuration of the power system, according to embodiments of the present disclosure. As in FIG. 1, FIG. 3 shows the system divided into 4 different control areas, including 370 (control area I), 375 (control area II), 380 (control area III) and 385 (control area IV).

Still referring to FIG. 3, the measurements units, 352 and 354 are placed at buses to measure bus voltage magnitude and phase angle, and bus power injections respectively. Meanwhile, a measurement unit, 356 is placed at one of terminal buses of a branch to measure the power flows along the branch.

The state vector at time k, $x^k$, is updated according to a linear discrete-time dynamic model $$x^{k+1} = A^k x^k + u^k + q^k, \quad (5)$$

where $x^{k+1}$ is the state vector at next time step (k+1), $q^k$ is the process noise vector, $A^k$ and $u^k$ are the linear system dynamic matrix and system state bases constructed in an online fashion using Holt's exponential smoothing technique. The process noise vector $q^k$ is assumed to be zero-mean Gaussian with covariance matrix $Q^k$. The matrices $A^k$ and $Q^k$ are assumed to be diagonal.

The quantities $A^k$ and $u^k$ are constructed as:

$$A^k = \alpha^k (1+\beta^k) I, \quad (6)$$

$$u^k = (1+\beta^k)(1-\alpha^k)\hat{x}^k - \beta^k L^{k-1} + (1-\beta^k) T^{k-1}, \quad (7)$$

where $\alpha^k$ and $\beta^k$ are parameters between 0 and 1, I is an identity matrix, and $\hat{x}^k$ is the predicted state estimate at time step k. The definitions for level and trend components of states, $L^k$ and $T^k$ are given as $$L^k \alpha^k x^k + (1-\alpha^k)\hat{x}^k, \quad (8)$$

$$T^k = \beta^k (L^k - L^{k-1}) + (1-\beta^k) T^{k-1}. \quad (9)$$

where $\hat{x}^k$ is the predicted state estimate at time step k.

A standard unscented Kalman filter (UKF) can be used to implement dynamic state estimation for a power system. Like the traditional Kalman filter, the UKF consists of a prediction stage based on the system dynamics and a correction stage based on the measurements. However, unique to the UKF, these stages are applied to a set of sampling points, representing different possible values for the estimated state.

The set of sampling points are generated from the current estimate, $x^k$, as follows $$[X^k]_1 = x^k,$$

$$[X^k]_i = x^k + c[\sqrt{P^k}]_{i-1}, (i=2,\ldots,2n+1),$$

$$[X^k]_i = x^k - c[\sqrt{P^k}]_{i-2n-1}, (i=2n+2,\ldots,4n+1), \quad (10)$$

where $\sqrt{P^k}$ is the Cholesky decomposition and c is an adjustable parameter given by $$c = 2n + \lambda, \quad (11)$$

$$\lambda = \alpha^2 (2n+\kappa) - 2n, \quad (12)$$

where $\alpha$ and $\kappa$ the parameters to adjust the width of sample distribution, n is the total number of buses in the system.

The UKF problem can be naturally solved in a centralized way, that is the dynamic state estimation for entire system is implemented at one centralized control center, and requires global communication with a central processor for all measurements acquiring from the system. For large systems with thousands of buses, the large systems will be computationally prohibitive to solve the fully centralized state estimation problem within real-time constraints. Decentralized approaches may alleviate the computational burden by decomposing the problem into smaller problems per area, as well as improving the system's robustness in the event of communication failures. The inter-area communications are needed to maintain reasonable solution accuracy for the power system. The challenge is how to make a good trade-off between solution accuracy and communication burden between control areas. As linear dynamic model is used, the easier to decouple the formulations at the prediction stage. The difficulty exists at the correction stage due to globally coupling of measurements with states.

Local Dependence of the Power System Measurement Equations

The present disclosure uses the local dependence of the power system measurement equations in order to achieve an approximate decoupling of the load-based dynamic state estimation problem.

In the standard version of the unscented Kalman filter, a correlation between any pair of measurements is presumed possible. The sample measurement covariance matrix in the centralized setting is given by $$S^k = R + \sum_{i=1}^{4n+1} w_i^c \left[ ([\hat{Y}^k]_i - \mu^k)([\hat{Y}^k]_i - \mu^k)^T \right], \quad (13)$$

However, due to the dependence of the power system measurement equations on a small number of localized states, $S^k$ exhibits a sparsity structure related to the underlying network structure. Wherein the present disclosure takes advantage of the lack of correlation between certain variables to allow for distributed processing of estimates and measurements, which promotes robustness and speed of the state estimation procedure, among other things.

To motivate this, is to possibly characterize analytically the sparsity of the measurement covariance in the centralized setting under a linear approximation to the measurement function. This is only an approximation since the equations are nonlinear but such an approach can be well-verified in practice. For simplification, the power injection measurements in this analysis is excluded. In defining the following set:

$$T_a \stackrel{def}{=} \{\text{the set of state variables that the functional form for measurement } y_a \text{ depends upon.}\} \quad (14)$$

For example, measurement function $y_a = P_{i-j}(\theta_i, V_i, \theta_j, V_j)$ depends upon $T_a = \{x_i, x_j\}$. Due to the assumption that the matrices $A_k$ and $Q^k$ are diagonal, the process noise has a diagonal covariance matrix $Q^k$, and the true underlying state $x^k$ is a random vector with Gaussian distribution $N(\mu_x^k, Q^k)$. Then, $x^{k+1} = A^k x^k + u^k + q^k$ remains an uncorrelated random vector, because the diagonal matrix $A^k$ introduces no mixing among the components of $x^k$. The quantity $y^{k+1} = h(x^{k+1})$ is a nonlinear function of the random vector $x^{k+1}$ and thus remains a random vector with some mean $\mu_x$ and covariance $S_*$. By exploiting the functional form of the linearized power system measurement functions we can characterize the sparsity pattern of $S_*$. The time step index k is dropped for notational convenience. Consider a first-order Taylor expansion of the measurement functions h(x) about the point $\mu_x$, $$h(x, \mu_x) \stackrel{def}{=} h(\mu_x) + J(\mu_x)(x - \mu_x), \quad (15)$$

where the measurement Jacobian J(x) is given by $$J(x) \stackrel{def}{=} \begin{bmatrix} \frac{\partial h_1(x)}{\partial \theta_1} & \cdots & \frac{\partial h_1(x)}{\partial V_n} \\ \vdots & \ddots & \vdots \\ \frac{\partial h_{m(x)}}{\partial \theta_1} & \cdots & \frac{\partial h_{m(x)}}{\partial V_n} \end{bmatrix}. \quad (16)$$

Noted is that a linear function of a Gaussian random vector remains a Gaussian random vector. Let $$\bar{y} = \bar{h}(x, \mu_x), \quad (17)$$

then since $x \sim N(\mu_x, Q)$ it follows that $\bar{y} \sim N(h(\mu_x) + J(\mu_x)\mu_x, J(\mu_x)QJ(\mu_x)^T)$. Note that the rows of the measurement Jacobian refer to measurements and the columns refer to state variables. Then, the quantity $$[S_*]_{ab} = [J(\mu_x)QJ(\mu_x)^T]_{ab} = \sum_{c=1}^{n} Q_{cc} J_{ac}(\mu_x) J_{bc}(\mu_x) \quad (18)$$

is non zero if and only if $T_a \cap T_b \neq \emptyset$. In summary, under the assumption that the matrices $A_k$ and $Q^k$ are diagonal and excluding power injection measurements, the sparsity of the linearized measurement covariance matrix, $S_*$ in the centralized setting is as follows:

$$[S_*]_{ab} = \begin{cases} s_{ab} \neq 0 & \text{if } T_a \cap T_b \neq \emptyset \\ 0 & \text{otherwise} \end{cases}, \quad (19)$$

where entry $[S_*]_{ab}$ refers to the covariance between measurements $y_a$ and $y_b$. As is expected that the sample measurement covariance matrix is to have a localized covariance structure for power system state estimation since the set $T_a$ includes at most a bus and its neighbors. Wherein, the present disclosure of the distributed method is able to take advantage of this.

Distributed Filtering Method for Load-based Dynamic State Estimation

In this section, the distributed method for dynamic state estimation is presented, along with the limited communication requirements are discussed. The electric power system is considered to be partitioned into control areas. In each control area, the local state is estimated while still taking into account the effects from the rest of the inter-connected power system. The communication requirements for a control area are determined based on its topology connectivity with neighboring control areas.

Figure 4:
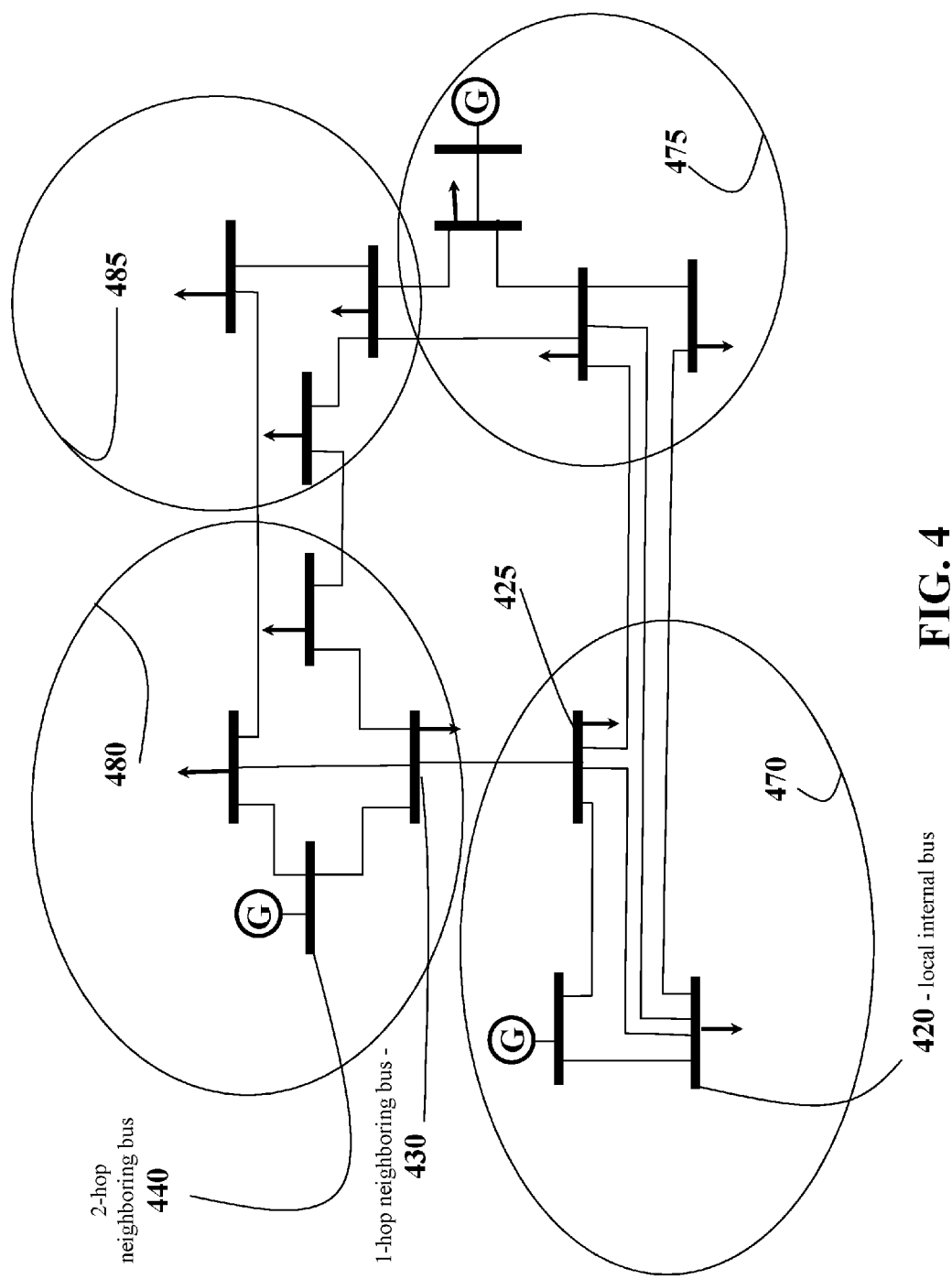
FIG. 4 is a schematic of local bus set, 1-hop neighboring bus set, and 2-hop neighboring bus set, according to some embodiments of the present disclosure.

FIG. 4 is a schematic of different bus sets that are used in the distributed dynamic state estimation. For example, FIG. 4 shows a local bus set 420 within a control area 470, wherein the local bus set 420 is defined as all buses located in the control area 470. Bordering buses may be in communication with buses of neighboring control areas. For example, a 1-hop neighboring bus 430, and 2-hop neighboring bus 440 are in communication with a bordering bus 425 of the local bus set 420 within the control area 470. The set of 1-hop neighboring buses can be defined as buses located at other neighboring control areas but share a common branch with a bus in the set of local buses, i.e. bordering buses. The 2-hop neighboring buses can be defined as buses located at other neighboring control areas but share a common branch with a 1-hop neighboring buses which in communication with the bordering bus of the control area. As in FIG. 4 shows the system divided into 4 different control areas, including 470 (control area I), 475 (control area II), 480 (control area III) and 485 (control area IV).

In particular, a bordering bus of the control area 470 may be connected to a 1-hop neighboring bus 430 of a neighboring control area 480. A 2-hop neighboring bus 440 is directly connected to the 1-hop neighboring bus 430 within the neighboring control area 480. The 2-hop neighboring bus 440 is in direct connection with the 1-hop neighboring bus 430 within the neighboring control area 480, without any buses between the 1-hop neighboring bus 430 and the 2-hop neighboring bus 440. A n-hop neighboring bus may be any bus directly connected with a (n−1)-hop neighboring bus within the neighboring control areas, wherein n is greater than one.

Measurements of power flows on tie-branches (i.e., a branch that connects buses across two different control areas) and measurements of power injections at border buses (i.e., a bus with a neighbor in another control area) introduce couplings between different control areas. The power network buses are partitioned into N control areas. For control area I, let $H_I^0$, $H_I^1$ and $H_I^2$ be the set of local buses, the set of 1-hop neighboring buses, and the set of 2-hop neighboring buses, respectively. Let the number of buses in control area I be $n_I$. The measurement set of control area I can be defined as follows $$y_I = \{\theta_i, V_i | i \in H_I^0\} \cup \{P_{i-j}, Q_{i-j} | i \in H_I^0, j \in H_I^1\} \cup \{P_{i-j}, Q_{i-j} | i \in H_I^1, j \in H_I^0\} \cup \{P_i, Q_i | i \in H_I^0\} \cup \{P_i, Q_i | i \in H_I^1\}, \quad (20)$$

In words, the set of measurements relevant to a control area include voltage phase angle and magnitude measurements at local buses, power flow measurements on internal branches (i.e., a branch joining two local buses) and tie-branches, and power injection measurements at local buses and neighboring buses connected via a tie-branch. In sum, $y_I$ is the set of all measurements whose measurement function involves states in $x_I = \{(\theta_i, V_i) | i \in H_I^0\}$.

At least one unique feature of the disclosed method is that power injections at neighbors in another control area are included in a control area's measurement set. The distributed method is developed based on performing a local unscented Kalman filter in each area with the following measurement set $$z_I = h_I(x_I, x_{H_I^1 \cup H_I^2}) + e_I, \quad (21)$$

where the dependence of the measurements on the global state x can be simplified to those in control area I and in $H_I^1 \cup H_I^2$. The inclusion of the set of 2-hop neighboring buses is another unique feature, among many unique features of the disclosed method. This is due to the functional form of the power system measurement equations under the AC power flow model. In fact, this is an important aspect of the method for developing a fully distributed dynamic state estimation method with limited communication between control areas.

Further, the measurements in control areas are not a partitioning of the measurements in the power system since a measurement can appear in more than one control area's measurement set (e.g., power flow measurement of a tie-branch). Each control area will estimate local states, $x_I \in R^{2n_I}$, and covariance $P_I \in R^{2n_I \times 2n_I}$ with limited communications with its neighbors.

Figure 5B:
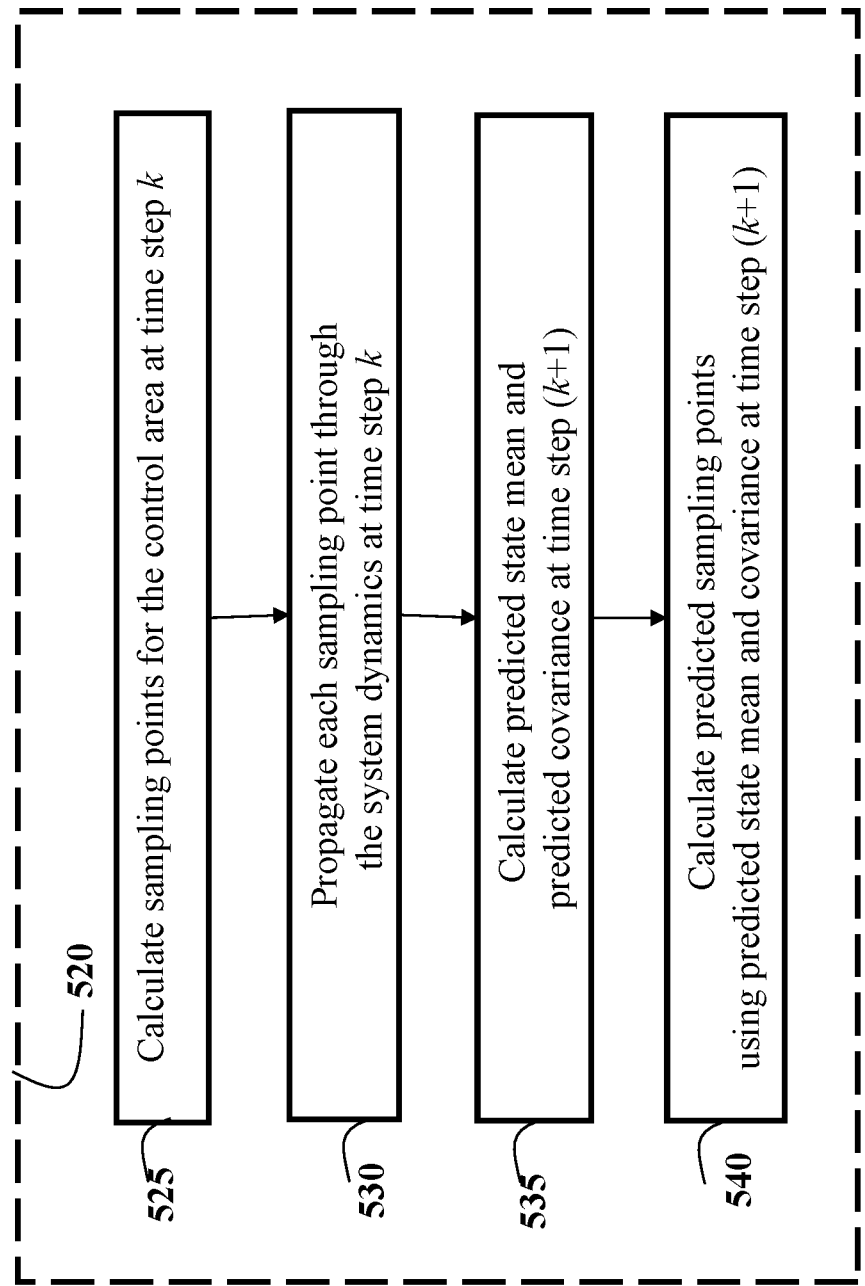
FIG. 5B is a schematic flow chart for predicting sampling points for states based on linear state dynamic equations, according to some embodiments of the present disclosure.
Figure 5C:
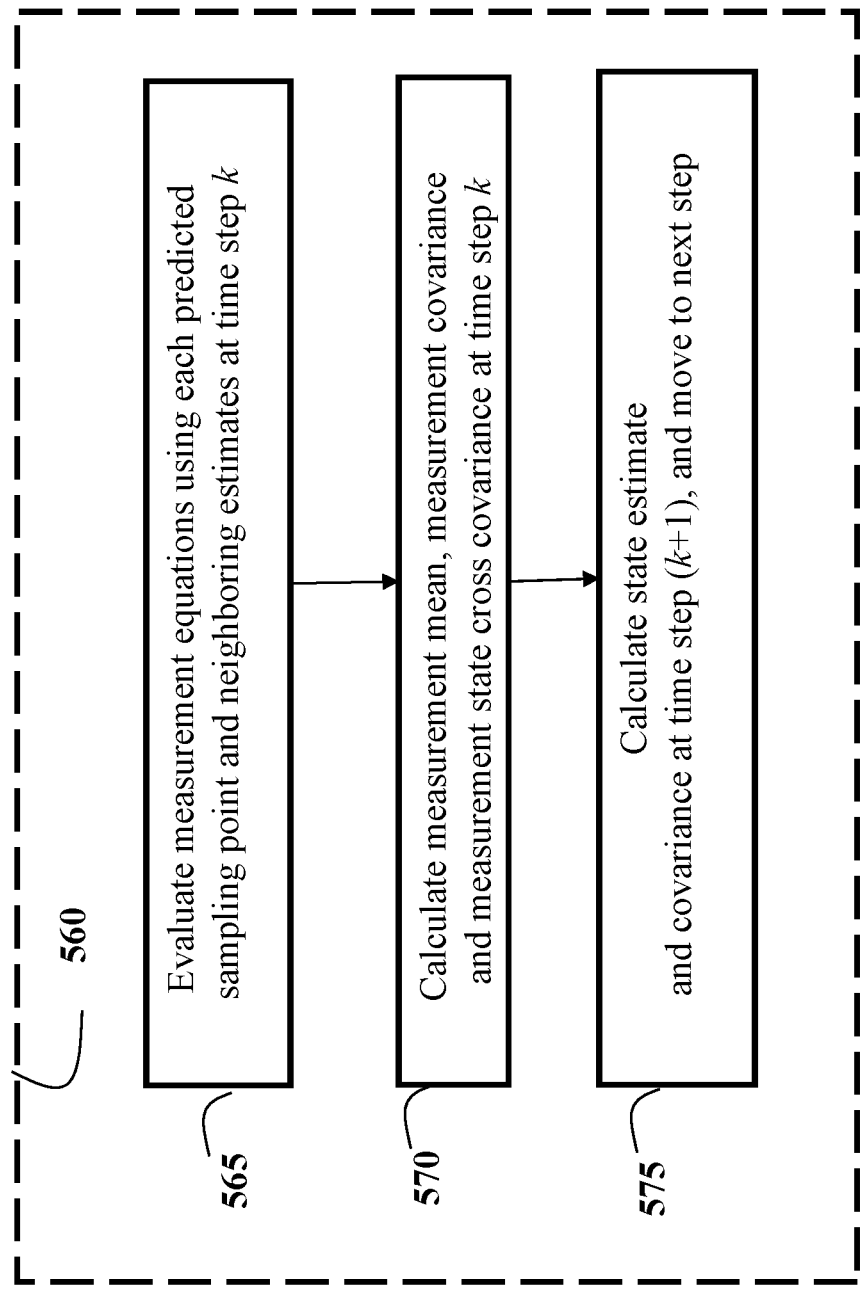
FIG. 5C is a schematic flow chart for updating state estimate and covariance with measurements using nonlinear measurement equations, according to some embodiments of the present disclosure.

FIGS. 5A-5C is a set of schematic flow charts for the distributed dynamic state estimation method, according embodiments of the present disclosure. FIG. 5A gives an overall procedure for implantation dynamic system estimation fully distributed. FIG. 5B and FIG. 5C give the corresponding steps used at state prediction stage, and state correction stage respectively, according embodiments of the present disclosure.

The overall procedure for distributed dynamic state estimation includes the following steps:

In step 510, the state estimate and covariance is initialized with given state $x_I^0$ and covariance to $P_I^0$, and in step 515, state levels and trends are initialized with given level $L_I^0$ and trend $T_I^0$, and the initial number of time step k is given.

In step 520, the predicted state mean and predicted covariance are determined for each bus of the local bus set $H_I^0$ for control area I at time step k using a set of sampling points for state estimates, and linear state dynamic equations, wherein the total number of buses in $H_I^0$ is $n_I$; The detailed steps are described in FIG. 5B.

In step 550, the control area I is communicating with neighboring areas to obtain states for buses of 1-hop neighboring bus set $H_I^1$ and 2-hop neighboring bus set $H_I^2$, $x_{H_I^1 \cup H_I^2}^k$ at time step k and power injections at buses of 1-hop neighboring bus set $H_I^1$, $\{P_i, Q_i | i \in H_I^1\}$, wherein $P_i$ and $Q_i$ are the active and reactive power injections at bus i;

In step 560, the state estimate, and state covariance are determined for each bus of the local bus set $H_I^0$ for control area I at next time step (k+1), $x_I^{k+1}$ and $P_I^{k+1}$ by updating predicted state estimates and covariance with measurements from local buses and power injections obtained from 1-hop neighboring buses, wherein the states of 1-hop and 2-hop neighboring buses are treated as constant inputs; The detailed steps are described in FIG. 5C.

In step 580, the time step will be checked against a pre-determined maximum number of steps. If the maximum step is reached, or a stop command is received from a power system operator, go to step 590, stop the dynamic process. Otherwise, increasing the time step k by 1 in step 585, and going to step 520 to perform state estimation for next time step.

As shown in FIG. 5B, the task implemented at state prediction stage is to determine predicted state mean and predicted covariance for control area I at time step k, and includes the following steps:

Step 525: calculating a set of sampling points $[X_I^k]_i$, i=1, 2, ..., $(4n_I+1)$ based on state estimate, and state covariance at time step k, $x_I^k$ and $P_I^k$:

$$[X_I^k]_1 = x_I^k, \quad (22)$$
$$[X_I^k]_i = x_I^k + c_I \left\lfloor \sqrt{P_I^k} \right\rfloor_{i-1}, (i = 2, \ldots, 2n_I + 1),$$
$$[X_I^k]_i = x_I^k - c_I \left\lfloor \sqrt{P_I^k} \right\rfloor_{i-2n_I-1}, (i = 2n_I + 2, \ldots, 4n_I + 1),$$

wherein, $[X_I^k]_i$ is the i-th sampling point for state estimates for control area I at time step k, $c_I$ is a vector of weight factors, $\sqrt{P_I^k}$ is the square root of covariance matrix $P_I^k$;

Step 530: propagating each sampling point through the system state dynamic equations defined as:

$$\lfloor \hat{X}_I^k \rfloor_i = [A_I^k]_{ii} [X_I^k]_i + \lfloor u_I^k \rfloor_i, i = \{1, \ldots, 4n_I+1\}, \quad (23)$$

wherein, $\lfloor \hat{X}_I^k \rfloor_i$ is the i-th sampling point for predicted state estimates at next time step (k+1), $\lfloor A_I^k \rfloor_{ii}$ and $\lfloor u_I^k \rfloor_i$ are the i-th diagonal entry of linear system dynamic matrix, and the i-th entry of state base vector determined for control area I at time step k;

Step 535: calculating predicted state mean and predicted covariance for control area I at next time step (k+1), $\bar{x}_I^k$ and $\bar{P}_I^k$:

$$\bar{x}_I^k = \sum_{i=1}^{4n_I+1} w_i^{m,I} [\hat{x}_I^k]_i, \quad (24)$$

$$\bar{P}_I^k = Q_I^k + \sum_{i=1}^{4n_I+1} w_i^{c,I} \left[ ([\hat{x}_I^k]_i - \bar{x}_I^k)([\hat{x}_I^k]_i - \bar{x}_I^k)^T \right],$$

wherein $w_i^{c,I}$ and $w_i^{m,I}$ are the weights that designed to sum to one, and $Q_I^k$ is the covariance matrix for process noises.

Step 540: calculating predicted sampling points for states for control area I at next time step (k+1), $\lfloor \bar{X}_I^k \rfloor_i$, i=1, 2, ..., $(4n_I+1)$:

$$[\bar{X}_I^k]_1 = \bar{x}_I^k,$$
$$[\bar{X}_I^k]_i = \bar{x}_I^k + c_I \left\lfloor \sqrt{\bar{P}_I^k} \right\rfloor_{i-1}, (i = 2, \ldots, 2n_I + 1)$$

$$[\overline{X}_I^k]_i = \overline{x}_I^k - c_I \left[\sqrt{P_I^k}\right]_{i-2n_I-1}, (i = 2n_I + 2, \ldots, 4n_I + 1), \quad (25)$$

The task for state correction stage as described in FIG. 5C is to determine state estimate, and state covariance for control area I at next time step (k+1), $x_I^{k+1}$ and $P_I^{k+1}$. The following steps includes:

Step 565: evaluating measurement equations using each predicted sampling point i, $[\overline{X}_I^k]_i$, i=1, . . . , (4$n_I$+1), and states obtained from neighboring estimates:

$$[\overline{Y}_I^k]_i = h_I([\overline{X}_I^k]_i, x_{H_I^1 \cup H_I^2}^k), \quad (26)$$

wherein $h_I$ is a set of nonlinear measurement functions of states of local buses and neighboring buses determined by the type and location of measurement corresponding to the entry of $[\overline{Y}_I^k]_i$;

Step 570: calculating the measurement mean, measurement covariance, and measurement state cross-covariance, $\mu_I^k$, $S_I^k$ and $C_I^k$ for control area I at next time step k:

$$\mu_I^k = \sum_{i=1}^{4n_I+1} w_i^{m,I} [\overline{Y}_I^k]_i, \quad (27)$$

$$S_I^k = R_I + \sum_{i=1}^{4n_I+1} w_i^{c,I} \left[([\hat{Y}_I^k]_i - \mu_I^k)([\hat{Y}_I^k]_i - \mu_I^k)^T\right], \quad (28)$$

$$C_I^k = \sum_{i=1}^{4n_I+1} w_i^{c,I} \left[([\overline{X}_I^k]_i - \overline{x}_I^k)([\overline{X}_I^k]_i - \overline{x}_I^k)^T\right], \quad (29)$$

wherein, $R_I$ is a pre-determined covariance of measurement noises for control area I.

Step 575: calculating state estimate and state covariance, $x_I^{k+1}$ and $P_I^{k+1}$ for control area I at next time step (k+1) according to:

$$x_I^{k+1} = \overline{x}_I^k \pm K_I^k [y_I^k - \mu_I^k], \quad (30)$$

$$P_I^{k+1} = \overline{P}_I^k - K_I^k S_I^k [K_I^k]^T, \quad (31)$$

$$K_I^k = C_I^k [S_I^k]^{-1}, \quad (32)$$

where $K_I^k$ is a filter gain for control area I.

In the step 530, the i-th diagonal entry of linear system dynamic matrix, and the i-th entry of state base vector determined for control area I at time step k can be determined according to:

$$A_I^k = \alpha_I^k (1 + \beta_I^k) I_I, \quad (33)$$

$$u_I^k = (1 + \beta_I^k)(1 - \alpha_I^k) x_I^k - \beta_I^k L^{k-1} + (1 - \beta_I^k) T^{k-1}, \quad (34)$$

wherein, $\alpha_I^k$ and $\beta_I^k$ are the smoothing parameters at time step k, $I_I$ is an identity matrix for control area I·$L^{k-1}$ and $T^{k-1}$ are the level and trend components for states at time step (k−1); wherein the level and trend components for states at time step k are determined according to:

$$L^k = \alpha_I^k X_I^k + (1 - \alpha_I^k) x_I^k, \quad (35)$$

$$T_k = \beta_I^k (L^k - L^{k-1}) + (1 - \beta_I^k) T^{k-1}, \quad (36)$$

The smoothing parameters $\alpha_I^k$ and $\beta_I^k$ used for control area I can also be set as a set of constant parameters, $\alpha_I$ and $\beta_I$ that determined by using the set of parameters to perform dynamic state estimation an minimal average absolute estimation error can be obtained for a set of historical data within a given set of time steps, where the average estimation error, $\zeta_I^Y$ is calculated according to:

$$\zeta_I^Y = \frac{1}{K} \frac{1}{n_I} \sum_{k=1}^{N} \sum_{j=1}^{N_I} \left|\check{Y}_{I,k}^j - Y_{I,k}^j\right|, \quad (37)$$

wherein K is the total number of time steps, $\check{Y}_{I,k}^j$ and $Y_{I,k}^j$ are the estimate and actual value of the voltage phase angle or magnitude at bus j in control area I at time step k.

Noted is that the distributed algorithm remains an approximation to the centralized algorithm due to the inability to fuse sampling points from different areas when evaluating the measurement function for tie-branch power flows and border bus power injections. Sampling points from different areas cannot be easily fused due to the incompatibility in their dimension and sample covariance. However, using the disclosed method, one may achieve reasonable performance with respect to the centralized estimates while making gains in computation time, scalability, and robustness.

According to aspects of an embodiment of the disclosure, the method may further include acquiring, for each control area, a set of local buses, a set of 1-hop neighboring buses, and a set of 2-hop neighboring buses from a network topology of the EPS from the historical data. The method can also include the current state of the control area that defines an estimation of a bus voltage magnitude and a bus voltage phase angle for buses in the control area. The method may include the current state of neighboring control areas includes an estimation of a bus voltage magnitude and a bus voltage phase angle for each 1-hop and 2-hop neighboring buses in each neighboring control area, and an estimation of a power injection for each 1-hop neighboring bus in each neighboring control area. Further, the method may include each control area of the multi-control area interconnected power network that is connected with adjacent control areas with tie branches, such that each control area includes a set of buses connected with branches and each branch connects with a pair of buses.

According to aspects of an embodiment of the disclosure, the method may include each control area is connected with an adjacent control area via tie branches, and at least one bus within the control area is in communication with one or more 1-hop neighboring bus of at least one neighboring control area, and the one or more 1-hop neighboring bus of the at least one neighboring control area is in communication with one or more 2-hop neighboring bus of the at least one neighboring control area. The method may include the historical state estimate of the control area that includes an estimation of a bus voltage magnitude and a bus voltage phase angle for buses in the control area. The method may include the state transition model that evaluates the historical state estimate by defining a transition of the estimates of the bus voltage magnitude and the bus voltage phase angle for the buses in the control area to determine the current state of the control area.

According to aspects of an embodiment of the disclosure, the method may include state transition model that is a system dynamic model, such that the system dynamic model is modeled as a linear combination of historical states. The method may include the corrected current state of the control area having a covariance for buses within the control area, and a state estimate for each bus within the control area, such that the state estimate for each bus includes a bus voltage magnitude and a bus voltage phase angle.

The above-described embodiments of the present disclosure can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine. Typically, the functionality of the program modules may be combined or distributed as desired in various embodiments.

Also, the embodiments of the present disclosure may be embodied as a method, of which an example has been provided. The acts performed as part of the method may be ordered in any suitable way. Accordingly, embodiments may be constructed in which acts are performed in an order different than illustrated, which may include performing some acts concurrently, even though shown as sequential acts in illustrative embodiments.

Although the present disclosure has been described by way of examples of preferred embodiments, the embodiments are to be understood that various other adaptations and modifications can be made within the spirit and scope of the present disclosure. Therefore, aspects of the appended claims to cover all such variations and modifications as come within the true spirit and scope of the present disclosure.

What is claimed is:

1. A method for dynamic state estimation (DSE) in an electric power system (EPS), comprising:
partitioning the EPS into multiple neighboring control areas, wherein the multiple neighboring control areas include a first control area;
estimating current states of buses in the first control area using the states of the buses via a state transition model of the buses of the first control area, wherein the estimating current states of buses in the first control area includes determining a predicted mean and a predicted covariance of a state for each bus, $H_I^0$ for the first control area I at time step k using a set of sampling points for state estimates, and linear state dynamic equations, wherein the total number of buses in $H_I^0$ is $n_I$, and wherein the states of the buses is from historical data of the EPS;
receiving, over a communication channel, a current state of at least some of 1-hop neighboring buses and at least some of n-hop neighboring buses located in the neighboring control areas, wherein a 1-hop neighboring bus is a bus of a neighboring control area that connects to at least one boarder bus of the first control area via at least one tie-branch, and wherein a n-hop neighboring bus is connected to the 1-hop neighboring bus within the neighboring control area via at least one tie-branch, wherein n is greater than one;
determining measurements of states from at least some buses in the first control area; and
updating the current state of the buses in the first control area using a measurement model on a basis of the estimated current states of the buses in the first control area, the received states from the neighboring control areas, and the measurements of states from at least some buses in the first control area, wherein at least some steps of the method are performed by one or more processor.

2. The method of claim 1, further comprising:
acquiring, a network topology of the EPS from the historical data.

3. The method of claim 1, wherein first control area is connected with neighboring control areas with tie branches, such that buses in the first control area and the neighboring control areas are connected with branches and each branch connects with a pair of buses.

4. The method of claim 1 wherein the n-hop neighboring bus is a 2-hop neighboring bus directly connected to the 1-hop neighboring bus with a tie branch from within the neighboring control area.

5. The method of claim 1, wherein the state transition model is a system dynamic model, such that the system dynamic model is modeled as a linear combination of historical states.

6. The method of claim 1, wherein the historical state estimate of the first control area includes an estimation of a bus voltage magnitude and a bus voltage phase angle for the buses in the first control area.

7. The method of claim 5, wherein the state transition model evaluates the historical state estimate by defining a transition of the estimates of the bus voltage magnitude and the bus voltage phase angle for the buses in the first control area to determine the current state of the first control area.

8. The method of claim 1, wherein the current state of the first control area defines an estimation of a bus voltage magnitude and a bus voltage phase angle for buses in the first control area.

9. The method of claim 1, wherein the current state of neighboring control areas includes an estimation of a bus voltage magnitude and a bus voltage phase angle for each 1-hop neighboring buses and n-hop neighboring buses in each neighboring control area, and an estimation of a power injection for each 1-hop neighboring bus in each neighboring control area.

10. The method of claim 1, wherein determining the predicted mean and the predicted covariance of the state for each bus $H_I^0$, for first control area I at time step k, comprises:
calculating a set of sampling points $[X_I^k]_i$, i=1,2, ..., $(4n_I+1)$ based on the state estimate, and a state covariance at time step k, $x_I^k$ and $P_I^k$:

$$[X_I^k]_1 = x_I^k,$$

$$[X_I^k]_i = x_I^k + c_I \left[ \sqrt{P_I^k} \right]_{i-1}, (i = 2, \ldots, 2n_I + 1)$$

$$[X_I^k]_i = x_I^k - c_I \left[ \sqrt{P_I^k} \right]_{i-2n_I-1}, (i = 2n_I + 2, \ldots, 4n_I + 1)$$

wherein, $[X_I^k]_i$ is the i-th sampling point for the state estimates for the first control area I at time step k, $c_I$ is a vector of weight factors, $\sqrt{P_I^k}$ is a square root of covariance matrix $P_I^k$;

propagating each sampling point through the state transition model defined as:

$$[\hat{X}_I^k]_i = [A_I^k]_{ii}[X_I^k]_i + [u_I^k]_i, i = \{1, \ldots, 4n_I+1\},$$

wherein, $\lfloor \hat{X}_I^k \rfloor_i$ is the i-th sampling point for predicted state estimates at next time step (k+1), $\lfloor A_I^k \rfloor_{ii}$ and $\lfloor u_I^k \rfloor_i$ are the i-th diagonal entry of linear system dynamic matrix, and the i-th entry of state base vector determined for first control area I at time step k;

calculating the predicted state mean and the predicted covariance for first control area I at next time step (k+1), $\bar{x}_I^k$ and $\bar{P}_I^k$:

$$\bar{x}_I^k = \sum_{i=1}^{4n_I+1} w_i^{m,I}[\hat{x}_I^k]_i,$$

$$\bar{P}_I^k = Q_I^k + \sum_{i=1}^{4n_I+1} w_i^{c,I}\left[([\hat{x}_I^k]_i - \bar{x}_I^k)([\hat{x}_I^k]_j - \bar{x}_I^k)^T\right],$$

wherein $w_i^{c,I}$ and $w_i^{m,I}$ are weights that are designed to sum to one, and $Q_I^k$ is a covariance matrix for process noises calculating predicted sampling points for the states for first control area I at next time step (k+1), $[\bar{x}_I^k]_i$, i=1,2, ..., (4$n_I$+1):

$$[\bar{X}_I^k]_1 = \bar{x}_I^k,$$

$$[\bar{X}_I^k]_i = \bar{x}_I^k + c_I\left\lfloor\sqrt{\bar{P}_I^k}\right\rfloor_{i-1}, (i = 2, \ldots, 2n_I + 1),$$

$$[\bar{X}_I^k]_i = \bar{x}_I^k - c_I\left\lfloor\sqrt{\bar{P}_I^k}\right\rfloor_{i-2n_I-1}, (i = 2n, +2, \ldots, 4n_I + 1).$$

11. The method of claim 10, wherein the i-th diagonal entry of linear system dynamic matrix, and the i-th entry of the state base vector determined for first control area I at time step k are determined according to:

$$A_I^k = \alpha_I^k(1+\beta_I^k)I_I, \quad (6)$$

$$u_I^k = (1+\beta_I^k)(1-\alpha_I^k)\hat{x}_I^k - \beta_I^k L^{k-1} + (1-\beta_I^k)T^{k-1}, \quad (7)$$

wherein, $\alpha_I^k$ and $\beta_I^k$ are smoothing parameters at time step k, $I_I$ is an identity matrix for control area I, $L^{k-1}$ and $T^{k-1}$ are a level and trend components for the states at time step (k−1).

12. The method of claim 11, wherein the level and trend components for that states at time step k are determined according to:

$$L^k = \alpha_I^k X_I^k + (1-\alpha_I^k)x_I^k,$$

$$T^k = \beta_I^k(L^k - L^{k-1}) + (1-\beta_I^k)T^{k-1}.$$

13. The method of claim 12, wherein the smoothing parameters $\alpha_I^k$ and $\beta_I^k$ for first control area I are set as a set of constant parameters, $\alpha_I$ and $\beta_I$ that are determined by using a set of parameters to perform dynamic state estimation an minimal average absolute estimation error is obtained for a set of historical time-related data within a given set of time steps of the historical data of the EPS, where an average estimation error, $\zeta_I^Y$ is calculated according to:

$$\zeta_I^Y = \frac{1}{K}\frac{1}{n_I}\sum_{k=1}^{N}\sum_{j=1}^{N_I}\left|\check{Y}_{I,k}^j - Y_{I,k}^j\right|$$

wherein K is a total number of time steps, $\check{Y}_{I,k}^j$ and $Y_{I,k}^j$ are an estimate and an actual value of the voltage phase angle or the magnitude at bus j in first control area I at time step k.

14. The method of claim 1, wherein determining measurements of states from at least some buses in the first control area includes an active flow measurement and an reactive power flow measurement for at least one branch in the first control area, a bus voltage magnitude measurement and a phase angle measurement for at least one bus in the first control area, and an active power injection measurement and an reactive power injection measurement for at least one bus in the first control area.

15. A control system of an electric power system (EPS), wherein the EPS includes multiple neighboring control areas (MNCA), the system comprising:
a memory to store historical states of the MNCA, current states of the MNCA and a state transition model that estimates current states of the MNCA using historical states of the MNCA;
a set of sensors arranged at measuring buses in the MNCA to measure one or combination of power flows, power injections, voltage magnitudes and phase angles on the measuring buses in the MNCA; and
a processor configured for updating the current state of a first control area of the MNCA via a measurement model and to update, using estimated current states of at least some buses in the first control area, states from neighboring control areas adjacent to the first control area including a current state of at least some of 1-hop neighboring buses and at least some of n-hop neighboring buses located in the neighboring control areas, wherein the estimating current states of buses in the first control area includes determining a predicted mean and a predicted covariance of a state for each bus, $H_I^0$ for the first control area I at time step k using a set of sampling points for state estimates, and linear state dynamic equations, wherein the total number of buses in $H_I^0$ is $n_I$, and wherein a 1-hop neighboring bus is a bus of a neighboring control area that connects to at least one boarder bus of the first control area via at least one tie-branch, and wherein a n-hop neighboring bus is connected to the 1-hop neighboring bus within the neighboring control area via at least one tie-branch, wherein n is greater than one, and the measurements of states from at least some buses in the first control area,
wherein the updated current state of the first control area of the MNCA is based on corresponding differences between one or combination of corresponding differences between updated power flows, updated power injections, updated voltage magnitudes and updated phase angles corresponding to the current state with the measurements of power flows, power injections, voltage magnitudes and phase angles for at least some buses in the first control area and neighboring control areas adjacent the first control area.

16. A method for dynamic state estimation (DSE) in an electric power system (EPS), comprising:
partitioning the EPS into multiple neighboring control areas, wherein the multiple neighboring control areas include a first control area;

estimating current states of buses in the first control area using the states of the buses via a state transition model of the buses of the first control area, wherein the states of the buses is from historical data of the EPS;
receiving, over a communication channel, a current state of at least some of 1-hop neighboring buses and at least some of n-hop neighboring buses located in the neighboring control areas, wherein receiving the current state of neighboring control areas includes communicating with neighboring control areas to obtain states for buses of 1-hop neighboring buses, $H_I^1$, and 2-hop neighboring buses, $H_I^2$, $x_{H_I^1 \cup H_I^2}$ at time step k and power injections at buses of 1-hop neighboring buses $H_I^1$, $\{P_i, Q_i | i \in H_I^1\}$, wherein $P_i$ and $Q_i$ are the active and reactive power injections at bus i, wherein a 1-hop neighboring bus is a bus of a neighboring control area that connects to at least one boarder bus of the first control area via at least one tie-branch, and wherein a n-hop neighboring bus is connected to the 1-hop neighboring bus within the neighboring control area via at least one tie-branch, such that n is greater than one;
determining measurements of states from at least some buses in the first control area; and
updating the current state of the buses in the first control area using a measurement model on a basis of the estimated current states of the buses in the first control area, the received states from the neighboring control areas, and the measurements of states from at least some buses in the first control area, wherein at least some steps of the method are performed by one or more processor.

17. A method for dynamic state estimation (DSE) in an electric power system (EPS), comprising:
partitioning the EPS into multiple neighboring control areas, wherein the multiple neighboring control areas include a first control area;
estimating current states of buses in the first control area using the states of the buses via a state transition model of the buses of the first control area, wherein the states of the buses is from historical data of the EPS;
receiving, over a communication channel, a current state of at least some of 1-hop neighboring buses and at least some of n-hop neighboring buses located in the neighboring control areas, wherein a 1-hop neighboring bus is a bus of a neighboring control area that connects to at least one boarder bus of the first control area via at least one tie-branch, and wherein a n-hop neighboring bus is connected to the 1-hop neighboring bus within the neighboring control area via at least one tie-branch, wherein n is greater than one;
determining measurements of states from at least some buses in the first control area; and
updating the current state of the buses in the first control area using a measurement model on a basis of the estimated current states of the buses in the first control area, the received states from the neighboring control areas, and the measurements of states from at least some buses in the first control area, wherein the updating of the current state of the buses in the first control area using the measurement model, the measurement model includes determining a state estimate, and a state covariance for each bus, $H_I^0$ for the control area I at next time step (k+1), $x_I^{k+1}$ and $P_I^{k+1}$ by updating the determined state estimates and the determined covariance with measurements from buses of the first control area and power injections obtained from 1-hop neighboring buses from neighboring control areas, wherein the states of 1-hop and 2-hop neighboring buses are treated as constant inputs, wherein at least some steps of the method are performed by one or more processor.

18. The method of claim 17, wherein determining the state estimate, and the state covariance for first control area I at next time step (k+1), $x_I^{k+1}$ and $P_I^{k+1}$, further comprising:
evaluating measurement equations using each predicted sampling point i, $[\bar{X}_I^k]_i$, =1, ..., (4$n_I$, +1), and states obtained from neighboring estimates of the neighboring buses, the measurement equations include:

$$[Y_I^k]_i = h_I([X_I^k]_i, x_{H_I^1 \cup H_I^2}),$$

wherein $h_I$ is a set of measurement functions of the states of the first control area and the state of neighboring buses determined by a type and a location of a measurement corresponding to an entry of $[Y_I^k]_i$;
calculating a measurement mean, a measurement covariance, and a measurement state cross-covariance, $\mu_I^k$, $S_I^k$ and $C_I^k$ for control area I at next time step k:

$$\mu_I^k = \sum_{i=1}^{4n_I+1} w_i^{m,I} [\bar{Y}_I^k]_i,$$

$$S_I^k = R_I + \sum_{i=1}^{4n_I+1} w_i^{c,I} \left[ ([\hat{Y}_I^k]_i - \mu_I^k)([\hat{Y}_I^k]_i - \mu_I^k)^T \right],$$

$$C_I^k = \sum_{i=1}^{4n_I+1} w_i^{c,I} \left[ ([\bar{X}_I^k]_i - \bar{x}_I^k)([\bar{X}_I^k]_i - \bar{x}_I^k)^T \right],$$

wherein, $R_I$ is a pre-determined covariance of measurement noises for first control area I;
calculating the state estimate and the state covariance, $x_I^{k+1}$ and $P_I^{k+1}$ for first control area I at next time step (k+1) according to:

$$x_I^{k+1} = \bar{x}_I^k + K_I^k [y_I^k - \mu_I^k],$$

$$P_I^{k+1} = \bar{P}_I^k - K_I^k S_I^k [K_I^k]^T,$$

$$K_I^k = C_I^k [S_I^k]^{-1},$$

wherein, $K_I^k$ is a filter gain for first control area I.

19. The method of claim 18, wherein the measurement model includes:
$h_I([X_I^k]_i, x_{H_I^1 \cup H_I^2})$ an active power flow equation, when the active power flow measurement is measured, or
an reactive power flow equation, when the reactive power flow measurement is measured, or
a bus voltage magnitude equation, when the bus voltage magnitude is measured; or
a bus voltage phase angle equation, when the bus voltage phase angle is measured; or
an active power injection equation, when the active power injection measurement is measured, or
an reactive power injection equation, when the reactive power injection measurement is measured,
wherein measured voltage phase angles and magnitudes for each bus of one of the first control area, neighboring control areas, or both, are displayed on at least one display of a EPS control system, and
wherein the processor controls voltage regulation devices of one of the first control area, neighboring control areas, or both, to drive the voltages on the buses of one of the first control area, neighboring control areas, or both, toward a predetermine level.

* * * * *